July 11, 1933.                  L. H. KING ET AL                  1,917,799
                                 ANTIGLARE DEVICE
                                Filed Feb. 19, 1931
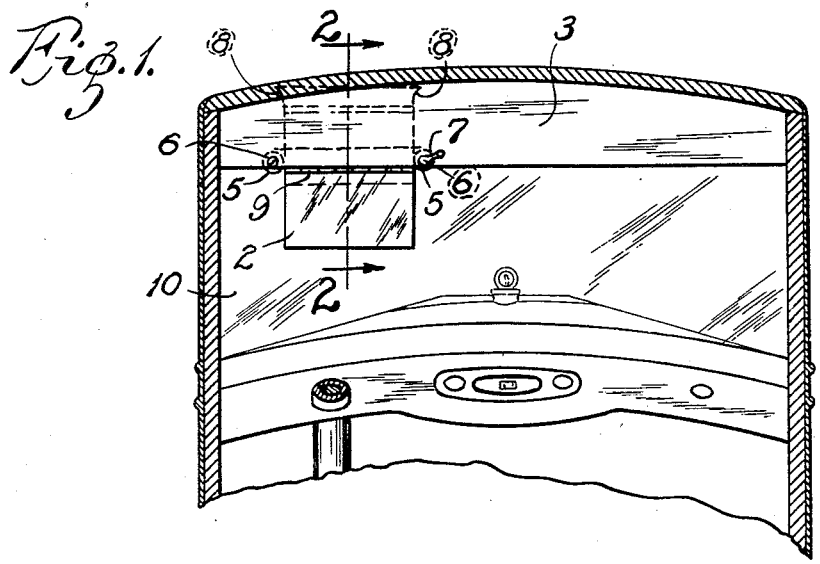
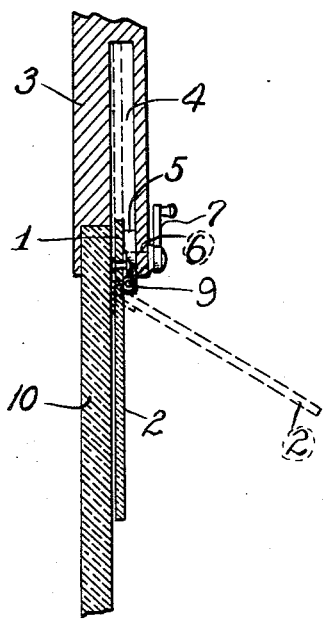
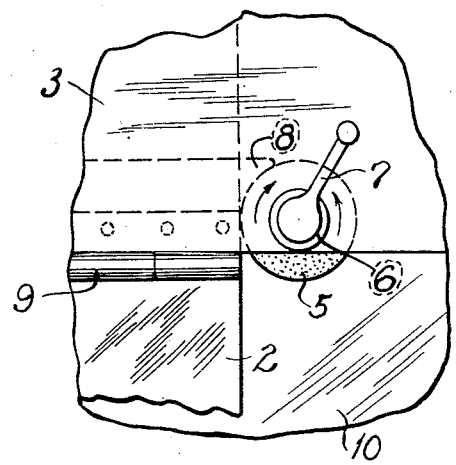
INVENTORS.
LUDLOW H. KING,
RAYMOND G. STOCK.
BY J. Henry Kinealy
          ATTORNEY.

Patented July 11, 1933

1,917,799

UNITED STATES PATENT OFFICE

LUDLOW H. KING AND RAYMOND G. STOCK, OF ST. LOUIS COUNTY, MISSOURI

ANTIGLARE DEVICE

Application filed February 19, 1931. Serial No. 516,962.

Our invention relates to anti-glare devices and more particularly to anti-glare devices which are permanently mounted in combination with the windshield structure of an automobile so as to be moved out of the way when not in use, but which may be quickly and easily moved into operative position when desired.

Heretofore, anti-glare devices have been attachments or accessories mounted on the outside of the windshield frame and in many cases have been unsightly to an extent to detract materially from the appearance of the interior of the automobile. A very great proportion of the automobiles now in use are closed, that is, the body includes glass panels to enclose the interior or tonneau. No anti-glare device which has been used in the past was adapted to be built in the windshield frame structure so that it would become in effect a part of the car and would therefore be more than a mere attachment.

The object of our invention is to provide an anti-glare device preferably combined with the windshield structure of an automobile so as to obviate these and other deficiencies.

One embodiment of our invention is clearly shown in the accompanying drawing wherein similar characters are used to designate similar parts: Fig. 1 is a view of the windshield structure and anti-glare device from the interior of an automobile; Fig. 2 is a cross section along the lines 2—2 in Fig. 1; and Fig. 3 shows in detail part of the device.

Referring to the figures our invention in its simplest form comprises an anti-glare device adapted to be carried by an automobile windshield frame and consisting of a supporting member 1 preferably in the form of a plate of metal or other suitable material and adapted to be carired by and mounted on the upper member of the windshield frame and a rigid glare screen 2 of colored glass or other suitable material hingedly mounted on the supporting member 1, as at 9. However, in the preferred form of our invention as shown in the drawing the anti-glare device is a definite part of the windshield structure and is combined therewith and, therefore, in this embodiment the upper frame member 3 of the windshield frame has extending upwardly from the lower edge thereof a pocket 4 adapted and arranged to receive the anti-glare device as described below. The means for moving the anti-glare device into and out of operative position, that is, for moving it out of and into the pocket 4 comprises a pair of rollers 5 of rubber, felt or other resilient material mounted on suitable shafts 6 in the frame member 3. These rollers are disposed and arranged to engage the side edges of the anti-glare device and because of the resiliency of the rollers the device will be maintained in any desired position. The device may be moved into or out of the pocket 4 by grasping the lower end of the screen 2 and exerting sufficient pressure in the desired direction, but in some cases this manner of moving the device may be objectionable and, therefore, we prefer that one of the rollers 5 be fixed to a shaft 6 and the shaft have at its outer end a small crank arm 7 whereby rotation of the crank arm will rotate the shaft 6 and in turn the roller 5 fixed thereto. It will readily be understood, therefore, that by rotating the roller 5 in the proper direction by means of the crank arm 7 the anti-glare device may be moved into or out of the pocket 4. The edges of the screen 2 in engagement with the rollers may be ground or otherwise roughened so that a firm engagement between these edges and the rollers will be obtained to facilitate movement of the device.

The anti-glare device is preferably rectangular in shape, but the supporting member 1 may have the upper ends thereof flared outwardly so that when the device is moved out of the pocket 4 the proper distance the flared upper ends 8 will engage the rollers and further outward movement will be prevented.

If the anti-glare device embodying our invention is mounted as shown in combination with the windshield structure it will be easily available for use and will add rather than detract from the beauty of the interior fittings of the automobile. We prefer that the anti-glare device be mounted in close proximity to the windshield glass 10 so that in addition to preventing glare the device will to some extent prevent misting of the windshield at the point covered by the screen 2. To this end one wall of the pocket 4 preferably is positioned substantially in or beyond the plane of the face of the windshield glass on which the device is adapted to move, as shown in Fig. 2 of the drawing. Also, because the screen 2 is hingedly mounted to the supporting member 1 it may be swung into position shown by the dotted lines in Fig. 2 for cleaning.

Although in the drawing attached hereto we have shown only one simple form of device embodying our invention it will readily be understood that in adapting our device for use in automobiles of different types the size, shape and arrangement of the various parts may be varied within wide limits without deviating from the spirit of our invention as included in the appended claims.

What we claim as new and desire to secure by Letters Patent, is:—

1. The combination with an automobile windshield structure comprising an upper frame member having a pocket extending upwardly from the lower edge thereof, of an anti-glare device arranged adapted to be positioned in said pocket when not in use and to be extended into position over a portion of the windshield glass when in use, said anti-glare device comprising a supporting member and a glare screen of rigid transparent material hingedly mounted thereto, means for moving said device into and out of said pocket and for maintaining said device in adjusted positon, and said pocket being arranged with respect to said windshield whereby when said anti-glare device is extended therefrom said glare screen will be in close proximity to said windshield glass.

2. The combination with an automobile windshield structure comprising an upper frame member and a pocket extending upwardly from the lower edge thereof, of an anti-glare device arranged and adapted to be positioned in said pocket when not in use and to be extended over a portion of the windshield glass when in use, said anti-glare device comprising a supporting member and a glare screen of rigid transparent material hingedly mounted thereto, means for moving said device into and out of said pocket and for maintaining said device in adjusted position, and said pocket having one wall thereof substantially in the plane of the face of said windshield glass over which said glare screen extends.

3. The combination of an automobile windshield structure comprising an upper frame member and a pocket extending upwardly from the lower edge thereof, of an anti-glare device arranged and adapted to be positioned in said pocket when not in use and to be extended into position over a portion of the windshield glass when in use, said anti-glare device comprising a supporting member and a glare screen of rigid transparent material hingedly mounted thereto, a pair of resilient rollers engaging the opposite edges of said anti-glare device whereby said device will be maintained in adjusted position, and the upper end of said supporting member being formed so that said device can not be moved downwardly out of engagement with said rollers, and said pocket having one wall thereof substantially in the plane of the face of said windshield glass over which said glare screen extends.

In witness whereof we have signed our names to the foregoing specification.

LUDLOW H. KING.
RAYMOND G. STOCK.